Jan. 2, 1968    R. G. ROSE    3,361,857
METHOD OF PREPARING A FUEL ELEMENT OF FISSIONABLE OXIDE
AND BURNABLE POISON
Filed Dec. 3, 1965

WITNESSES

INVENTOR
Richard G. Rose
BY
ATTORNEY

United States Patent Office 3,361,857
Patented Jan. 2, 1968

3,361,857
METHOD OF PREPARING A FUEL ELEMENT OF FISSIONABLE OXIDE AND BURNABLE POISON
Richard G. Rose, East McKeesport, Pa., assignor to Westinghouse Electric Corporation, Pittsburgh, Pa., a corporation of Pennsylvania
Filed Dec. 3, 1965, Ser. No. 511,438
8 Claims. (Cl. 264—.5)

This invention relates to a fuel element for nuclear reactors and, more particularly, it pertains to a fuel element that incorporates a pellet having burnable poison homogeneously distributed therein.

As the nuclear reactor art has developed, a neutron absorber or poison material generally known as "burnable poison" has been adopted which is capable of absorbing neutrons while producing no new or additional neutrons or transforming into new poisons as a result of neutron absorption. A typical burnable poison is boron, which, on being irradiated by thermal neutrons undergoes the reaction $B^{10}+n^1 \rightarrow Li^7+He^4$. The thermal neutron absorption cross section is reduced from 3840 to 0.033 barns in the reaction. The addition of a burnable poison to a reactor can be used to (1) extend the life of fuel elements having increased enrichment, (2) reduce the number of control rods required for a given core life, and (3) control power generation to achieve a relatively uniform output over the life of the core.

The uses of a burnable poison at various locations in reactor cores including within the fuel pellets, coatings on the pellets and in cladding of the tubes, have met with mixed results. Prior attempts, however, to provide fuel pellets having a burnable poison dispersed uniformly in the fuel component have been relatively unsatisfactory. Where a sintered uranium dioxide fuel pellet is used containing about 100 p.p.m. of boron, the fabrication of the pellets by conventional powder metallurgy techniques has resulted in unacceptable and variable losses of boron (as much as 50%) during the sintering cycle.

It has been found that conventional techniques for the fabrication of sintered uranium dioxide pellets containing about 100 p.p.m. of boron as a burnable poison additive may be modified in accordance with the present invention to minimize the loss of boron occasioned by the sintering cycle and thereby overcome most of the prior art difficulties.

Accordingly, it is an object of this invention to provide a process for producing a nuclear fuel element having selected proportions of boron homogeneously distributed therethrough.

It is another object of this invention to provide a process for producing sintered uranium dioxide fuel pellets containing boron in amounts substantially equal to the quantity of boron added prior to the sintering cycle.

Finally, it is an object of this invention to overcome the foregoing problems and desiderata in a simple and effective manner.

For a better understanding of the nature and objects of the invention, reference is made to the following detailed description and drawings, in which.

In accordance with this invention, it has been found that the foregoing problems may be solved by adopting an improved sintering procedure for preparing sintered pellets of a nuclear fuel and a burnable poison such, for example, as uranium dioxide containing a uniform distribution of selected proportions of boron. The procedure involves the mixing and blending of powders of uranium dioxide and zirconium diboride together with a small amount of a temporary or transient binder. A quantity of the blended powders is cold-pressed to form a green pellet which is preliminarily pre-sintered in vacuum at about 300° C. after which it is further pre-sintered in hydrogen at about 700° C., following which it is fully sintered in hydrogen at about 1675° C.

Figure 1:
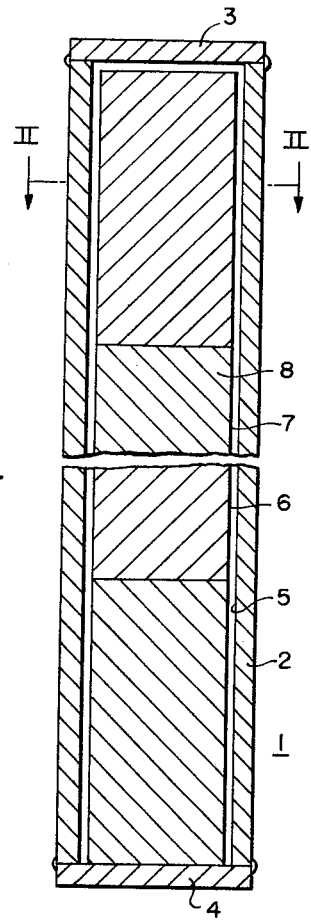
FIGURE 1 is a longitudinal sectional view of a fuel element having a plurality of sintered pellets of uranium dioxide containing a burnable poison homogeneously distributed therethrough.

As shown in FIG. 1, a fuel rod or element is generally indicated at 1 and comprises an elongated cladding tube 2 having end closures 3 and 4 for providing an enclosed chamber 5 in which a plurality of fissionable fuel pellets 6 are disposed in end-to-end abutment. The tube 2 and pellets 6 are preferably circular and have a length of about twice their diameter. The pellet diameter is slightly less than that of the tube and forms a clearance space 7 therewith to accommodate any swelling of the pellet during use in a reactor.

Figure 2:
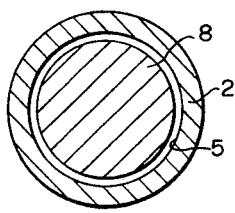
FIG. 2 is a transverse sectional view along the line II—II of FIG. 1.

As shown in FIGS. 1 and 2, each pellet 6 includes a sintered body portion of fissionable material 8 such as uranium dioxide ($UO_2$) and a selected amount of a burnable poison. In making the pellets, uranium dioxide, for instance, suitably enriched, as for example 3 to 5% in the form of a powder having a particle size of $-120$ to $+170$ mesh is compacted and subsequently sintered following the schedule described previously, to obtain a pellet density after sintering of approximately 90 to 96% of the theoretical density. Thereafter, each pellet is surface ground, for example, by centerless grinding to a cylindrical shape having a diameter in the range of from 0.2 to 0.5 inch. Each pellet is then washed in water and normally dried by vacuum whereupon it is ready for insertion into the tube 2.

The body portion of the fuel pellets may be composed of a substantial proportion of a dioxide of one of the fissionable isotopes, such as $U^{235}$, $U^{233}$, $Pu^{239}$, and $Th^{232}$ or mixtures thereof, the balance being $U^{238}$ or other uranium or thorium derivatives. Uranium oxide ($UO_2$) has given excellent results.

In addition to the fissionable material such as enriched $UO_2$, each pellet 6 contains a burnable poison, such as boron, cadmium, gadolinium, samarium, and europium, all of which have a high initial neutron capture cross section and which, upon the absorption of neutrons, result in elements of low neutron capture cross section.

The element boron is particularly satisfactory when added in predetermined quantities for obtaining the object of a more uniform distribution of power generation for a given quantity of fissionable material. Boron may be added in the form of boron metal powder, boron carbide ($B_4C$), or as zirconium diboride ($ZrB_2$).

An additional ingredient is a temporary or transient organic binder and lubricant which is added to the blended mixture of the uranium dioxide and zirconium diboride. The binder and lubricant facilitates the compacting and cold pressing of the pellet prior to the pre-sintering operations.

The amount of boron atoms in the sintered pellet as initially used may vary from 25 to 500 parts per million (p.p.m.) depending upon the amount of burnable poison desired. The range of normally desirable weight percentages for each pellet ingredient are listed in Table I for each type of boron compound that may be used.

TABLE I.—EQUIVALENTS OF INITIAL ADDITIVES FOR VARIOUS BORON COMPOUNDS

| Boron in Sintered Pellets (p.p.m.) | Amounts of Initial Additives (wt. Percent) | | |
|---|---|---|---|
| | B4C | UO2 | Binder |
| 25 | 0.003 | 98.036 | 1.961 |
| 500 | 0.062 | 97.977 | 1.961 |
| | ZrB2 | | |
| 25 | 0.012 | 98.027 | 1.961 |
| 500 | 0.256 | 97.783 | 1.961 |
| | Powdered Boron | | |
| 25 | 0.002 | 98.037 | 1.961 |
| 500 | 0.049 | 97.990 | 1.961 |

The method by which the green pellets are presintered and sintered involves the following sequence:
(1) Pre-sinter in vacuum for about 2 hours at about 250° C. to 350° C.
(2) Pre-sinter in hydrogen for 2 to 3 hours at about 600° to 700° C.
(3) Full sinter in hydrogen for about 4 hours at a temperature ranging from about 1500° to 1800° C.

The sequence has the purpose of removing the binder by decomposition and volatilization preventing oxidation of the zirconium diboride. The three-step sintering procedure avoids the problem of the loss of boron during sintering during the processing of uranium dioxide pellets containing boron.

The compacted or cold pressed green pellet is preliminarily pre-sintered in a partial vacuum of $<5\mu$ a temperature ranging from 250 to 350° C. and preferably at 300° C. for a period of one and one-half to three hours and preferably at two hours for the purpose of removing by decomposition, volatilization and combustion the organic binder without affecting the basic mixture of $UO_2$ and $ZrB_2$.

The binder-lubricant may be composed of one of a series of commercially available organic binder examples of which are polyvinyl alcohol and a lubricant such as a polyethylene glycol, one commercially available lubricant being designated as Carbowax 4000. For instance, an aqueous mixture of the polyvinyl alcohol and Carbowax 4000 is added to the blended powders or uranium dioxide and zirconium boride.

The hydrogen pre-sinter step is performed between 600 and 700° C. for 2 to 3 hours and preferably at about 700° C. for 2 hours. The purpose of this step is to adjust the oxygen-uranium ratio whereby any excess in oxygen, such as in hyperstoichiometric $UO_2$, combines with water vapor leaving stoichiometric uranium oxide and thereby prevents the oxidation of boron from zirconium diboride in the subsequent sintering step in the higher temperature ranges.

Actual or full sintering of the pellet is conducted in hydrogen at one atmosphere pressure, in a temperature ranging from 1500° to 1800° C. for up to six hours with the preferred temperature being 1675° C. for four hours. The sintering causes densification of the pellet resulting in a sintered dense body from the compacted powders.

The following example is illustrative of the present invention:

EXAMPLE

A homogeneous mixture of the ingredients of the fuel pellet is prepared by blending a mixture of uranium dioxide and zirconium diboride in the form of powders having a preferred composition of 97.988 weight percent uranium dioxide and 0.051 weight percent zirconium diboride. To the mixture is added a binder-lubricant aqueous solution of polyvinyl alcohol and a solid polyethylene glycol (HOCH2) (CH2OCH2)X (CH2OH). The polyethylene glycol may be a commercially available lubricant sold under the trademark "Carbowax 4000." The mixture of the binder and lubricant is added to the blend of uranium dioxide and zirconium diboride in an amount of about 2.0 weight percent.

The mixture of the uranium dioxide, zirconium diboride, and the binder with lubricant is compacted by cold pressing into a cylindrical pellet.

The pellet is then subjected to a pre-sinter in a vacuum at 300° C. for two hours to burn off the binder and lubricant without affecting the uranium dioxide and zirconium diboride.

After cooling the pellet to room temperature it is subjected to a second pre-sintering in hydrogen at one atmosphere pressure at 700° C. for a period of about two hours for the purpose of removing any excess oxygen which may exist in the form of hyperstoichiometric uranium dioxide, thereby leaving the stoichiometric uranium dioxide with the original content of zirconium diboride.

Thereafter, the pellet is sintered in hydrogen at one atmosphere pressure for about four hours at 1675° C. whereby the compacted powders are sintered into a dense body having a density of approximately 90 to 96% of the theoretical density.

The resulting sintered pellet is surface ground by centerless grinding procedure to the precise diameter whereupon it is ready for insertion into a cladding tube 2 of a fuel element.

The uranium dioxide ($UO_2$) preferably includes enriched uranium dioxide such as 3.2% or 3.8% uranium dioxide. The required boron content may vary from 25 to 500 p.p.m. The addition of 0.051 weight percent zirconium diboride is equivalent to the addition of 100 p.p.m. boron to the sintered pellets.

In a similar way other uranium, plutonium and thorium oxides, and other burnable poisons may be made into pellets.

Thermodynamic data for zirconium diboride-hydrogen, zirconium diboride-oxygen, and zirconium diboride-water vapor reactions show that the zirconium diboride-hydrogen reactions are thermodynamically unfavorable. The thermodynamically favorable zirconium diboride-oxygen reaction is $$ZrB_2 + \frac{5}{2} O_2 \rightarrow ZrO_2 + B_2O_3$$

Less favorable reactions, though still thermodynamically favorable, are $$ZrB_2 + 8H_2O \rightarrow ZrO_2 + 2H_3BO_3 + 5H_2$$
$$ZrB_2 + 6H_2O \rightarrow ZrO_2 + 2HBO_2 + 5H_2$$

Analyses of the remaining elements in the pellet after each of the steps of the process are shown in the table as follows:

TABLE II.—ANALYTICAL RESULTS
[P.p.m. except for O/U ratio]

| Zirconium Diboride (−120 to +170 mesh) Addition | B | Zr | C | N | O/U |
|---|---|---|---|---|---|
| As pressed | 42 | 240 | | | |
| | 67 | 320 | | | |
| Vacuum pre-sintered at 300° C | 90 | 450 | | | 2.11 |
| | 62 | 310 | 2,930 | 10 | |
| Vacuum pre-sintered at 300° C.+ hydrogen pre-sinter at 700° C | 62 | 380 | | | 2.07 |
| | 75 | 430 | 3,280 | 10 | |
| Sintered in hydrogen (vacuum pre-sinter+hydrogen pre-sinter) | 49 | 270 | | | 2.00 |
| | 42 | 300 | 84 | 150 | |

Two analyses were taken for each step in the procedure, namely, the as pressed, vacuum pre-sintered at 300° C., vacuum pre-sintered at 300° C.+hydrogen pre-sinter at 700° C., etc. Though variations in boron and zirconium between each pair of tests exist, the boron content remains substantially constant throughout the entire processes of pre-sintering and sintering. The first specimen of each test is used for boron and zirconium analyses as well as the ratio of oxygen to uranium, while the second test of each analyses is used for boron and zirconium as well as the analyses of carbon and nitrogen. As indicated in Table II, the oxygen to uranium ratio diminishes as the successive sintering processes are performed.

Accordingly, it is evident that by adopting the three-step process of first pre-sintering a pellet in a vacuum at 300° C. followed by pre-sintering in hydrogen at 700° C., and finally sintering in hydrogen at about 1675° C. provides a pellet having the desired boron content for use as a burnable poison in a fuel element pellet. The process of the present invention therefore, satisfies all prior procedures which did not include the hydrogen pre-sintering step at 700° C. and as a result caused the burn-up of approximately 50% of the boron during the final sintering procedure at the more elevated temperatures.

Figure 3:
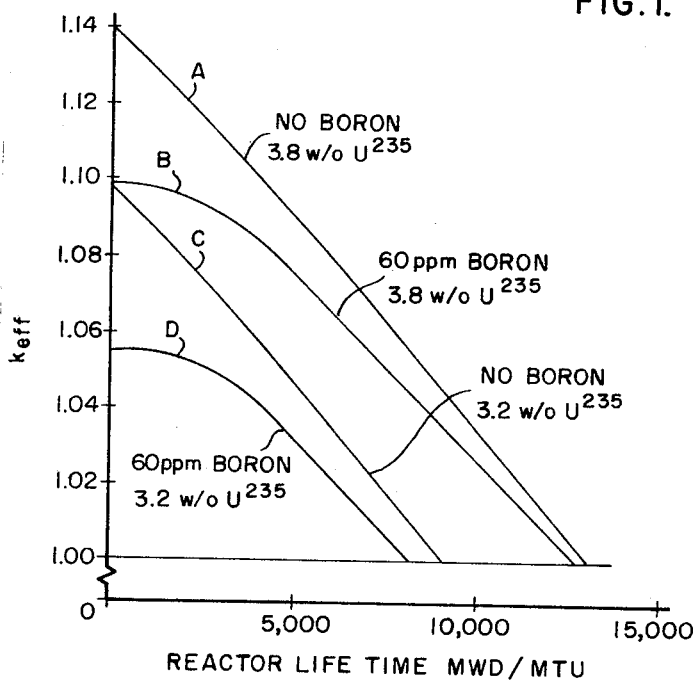
FIG. 3 is a graph showing the effect of burnable poison on the life of a reactor using various enrichments of $U^{235}$.

FIG. 3 shows the effect of additions of a burnable poison, namely, boron, upon the reactivity of a reactor, where the effective reactivity constant (Keff) is plotted against the reactor lifetime as measured by megawatt days/metric tons of uranium (MWD/MTU). Curves A and C show the reactivity of 3.8 weight percent (w/o) enriched $U^{235}$ and 3.2 w/o uranium 235, respectively. Both curves A and C extend to very high levels of initial reactivity and decreases linearly during the reactor lifetime.

Curves B and D show the reactivity for $U^{238}$ enriched with 3.8 w/o $U^{235}$ and enriched with 3.2 w/o $U^{235}$ respectively, where boron in 60 p.p.m. is added. Manifestly, the addition of 60 p.p.m. boron to the enriched $U^{235}$ greatly reduces the initial reactivity of the enriched fissionable material with only minor reduction in the reactor lifetime.

In other words, the addition of a burnable poison such as boron greatly reduces the total number (or volume) of control rods that must be provided in a reactor if the burnable poison is not added. The upper ends of the curves A and C are a measure of the total amount of control rod material which must be added where boron is omitted. Accordingly, the use of burnable poison is significant because first fuel loading of the cores can be greatly increased, leading to longer core life. Burnable poison can be introduced in sufficient quantities to lower the initial reactivity and result in fewer control rods. Moreover, the rods are further out of the core during operation which leads to improved power distribution. An additional significance resulting from the use of burnable poison is that the poison can be placed in locations in the core which will effectively flatten the curve of the power distribution throughout the core.

It is understood that the above specification and drawings are exemplary of the technical and economically feasible methods for incorporating burnable poisons in a fuel element and thereby make possible the extension of the core life of a nuclear reactor by economic means.

What is claimed is:

1. The method for preparing a fuel element of precise dimension embodying a predetermined proportion of a burnable poison for use in a nuclear reactor comprising the steps of: mixing quantities of fissionable oxide material, a selected amount of a burnable poison comprising an inorganic compound, and an organic binder into a homogeneous blend, compressing the mixture into a compact mass, heating the compact mass in a vacuum for 1½ to 3 hours at a temperature ranging from about 250° to 350° C. to cause the organic binder to be removed by decomposition and volatilization, heating the compact mass in a hydrogen atmosphere for 1 to 3 hours at a temperature ranging from about 600° to 700° C. to remove excess oxygen, and sintering the compact mass in a hydrogen atmosphere for 1 to 6 hours at a temperature ranging from about 1500° to 1800° C.

2. The method of claim 1 in which the fissionable material is selected from a group consisting of uranium dioxide, plutonium dioxide, thorium dioxide, and any combination thereof, and in which the burnable poison is selected from a group consisting of boron, gadolinium, cadmium, samarium, europium, and compounds thereof.

3. The method of claim 1 in which the compact mass is cooled to room temperature after each heating step.

4. The method of claim 1 in which the step of heating the compact mass in a vacuum atmosphere is performed at 300° C. for 2 hours.

5. The method of claim 1 in which the step of heating the compact mass in a hydrogen atmosphere is performed at 700° C. for 2 hours.

6. The method of claim 1 in which the step of sintering the compact mass in hydrogen is performed at 1675° C. for 4 hours.

7. The method of claim 1 in which the compact mass is heated in a vacuum at about 300° C. for 2 hours, and in which the compact mass is heated in hydrogen at 700° C. for 2 hours.

8. The method of claim 1 in which the compact mass is heated in a vacuum at about 300° C. for 2 hours, in which the compact mass is heated in hydrogen at 700° C. for 2 hours, and in which the compact mass is sintered in hydrogen at 1675° C. for 4 hours.

References Cited

UNITED STATES PATENTS

| | | | |
|---|---|---|---|
| 3,051,566 | 8/1962 | Schwartz | 264—.5 |
| 3,230,280 | 1/1966 | Kennedy | 264—.5 |
| 3,236,921 | 2/1966 | Sermon | 264—.5 |
| 3,263,004 | 7/1966 | Bean | 264—.5 |
| 3,320,176 | 5/1967 | Davis | 264—.5 XR |
| 3,329,744 | 7/1967 | Kaufmann et al. | 264—.5 |

L. DEWAYNE RUTLEDGE, *Primary Examiner.*

BENJAMIN R. PADGETT, *Examiner.*

S. J. LECHERT, JR., *Assistant Examiner.*